Feb. 15, 1955  C. M. CHORPENING  2,702,354
CONTACT MICROPHONE

Filed Feb. 28, 1952  2 Sheets-Sheet 1

INVENTOR
CREED M. CHORPENING

BY *Francis J. Klempay*
ATTORNEY

Feb. 15, 1955  C. M. CHORPENING  2,702,354
CONTACT MICROPHONE

Filed Feb. 28, 1952  2 Sheets-Sheet 2

INVENTOR
CREED M. CHORPENING

BY *Francis J. Klempay*

ATTORNEY

United States Patent Office 2,702,354
Patented Feb. 15, 1955

2,702,354
CONTACT MICROPHONE

Creed M. Chorpening, Conneaut, Ohio, assignor to The Astatic Corporation, Conneaut, Ohio, a corporation of Ohio Application February 28, 1952, Serial No. 274,029

8 Claims. (Cl. 310—8.6)

This invention relates to electro-mechanical devices for detecting and reproducing mechanical vibrations and sounds, and more particularly to such a device which is operative to detect such vibrations and sounds only when in contact with the body causing emission thereof.

This invention seeks, as its ultimate object, to provide an improved "contact type" microphone which is adapted to translate direct mechanical vibrations, and no others, into electrical signals capable of amplification and reproduction in the form of sound or visual pattern in the usual manner. Contact microphones are of course well known to the art, and at least some of the known designs have been advanced for the ultimate purpose of providing a detector of direct mechanical vibrations only. I am aware, however, that the existing contact microphone designs have generally accomplished their intended purpose by reducing the sensitivity of the device to air pressure variations while increasing its sensitivity or ability to detect direct mechanical vibrations. I have found such an arrangement to be unsuitable for my purposes, since while sensitivity to air pressure variations may be substantially reduced, such a device will pick up or detect such variations to a certain degree, thereby causing inaccurate reproductions and in some cases an undesirable feed back of the detected signal. My device, on the other hand, is at all times wholly unresponsive to air pressure vibrations substantially regardless of the magnitude thereof as will become apparent upon consideration of the detailed description to follow.

Another object of the present invention is the provision of a sound or vibration detecting device having the characteristics set forth above which is operated by means of a resiliently reciprocable contact probe member which is adapted when the detecting device is in use, and only then, to bear upon a piezoelectrical or similar translating device in such manner as to cause potential variations therein in accurate and sensitive response to vibrations transmitted to the contact probe from a member under observation. As will hereinafter appear my novel use of a resiliently reciprocable contact member rather than a rigidly mounted vibration transmitting contact member permits of a simple arrangement for detecting very weak vibratory signals and as will also become apparent my device is particularly adapted for use in detecting predominantly weak signals such as heart beats and the like.

Another object of the invention is the provision of a contact microphone of the character described which is compact, light in weight, and rugged in construction so as to be suitable for use as an electronic stethoscope, for example.

Yet another object of the invention is the provision of a contact type vibration detecting device which includes means for preventing or minimizing damage to the piezoelectric or other translating element in the event that the device is dropped or the contact probe is otherwise accidentally forced into violent contact with the translating element. My device, when constructed in accordance with this object is ideally suited for use as an electronic stethoscope, for example, where the same is likely to be in constant use and it is not always possible to exercise great care in the handling and use thereof.

The above and other objects and advantages of the invention will become apparent upon full consideration of the following detailed specification and accompanying drawing wherein is illustrated a certain preferred embodiment of my invention.

Figure 1:
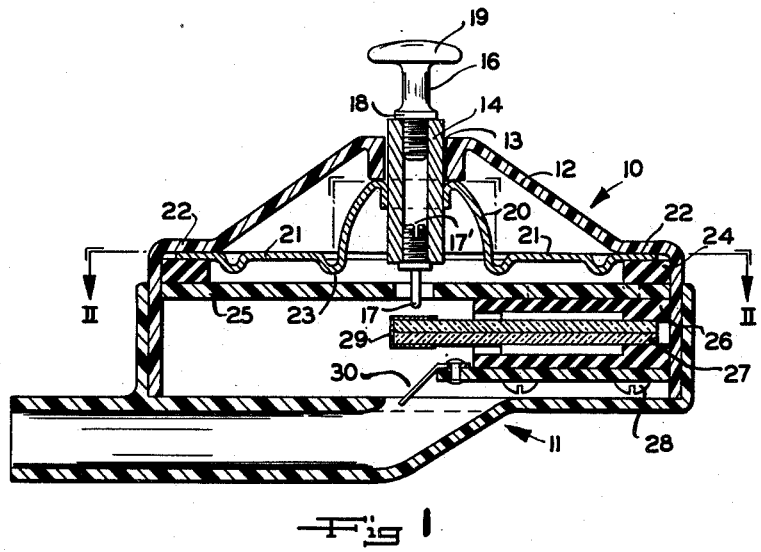
Figure 1 is a longitudinal cross sectional view of a contact microphone constructed in accordance with the teachings of my invention.

Referring now to the drawing the numerals 10 and 11 designate respectively front and back housing members which are separable but normally assembled in the manner shown in Figure 1, and which serve to enclose the operating parts of my device. The front housing member 10 is provided with a forwardly extending frustro-conical portion 12 having a centrally located axially aligned bore 13 therein for the slidable reception of a cylindrical operating stem 14 to be later more fully described.

In the embodiment of my invention illustrated herein the housing members 10 and 11, and many of the other principal parts, are indicated as being constructed of plastic material. While I prefer such construction due to its ruggedness and its lightness of weight, it will be understood that stamped or die cast metal parts may be substituted in many instances without adversely affecting the operation of my device.

The operating stem 14, as shown in Figure 1, comprises a short length of plastic material which is adapted to be slidably received in the bore 13; it being also observed that the frustro-conical portion 12 is thickened substantially at its outer end portion to provide adequate guidance for the operating stem 14. An axial bore 15 is provided in the operating stem 14 extending concentrically throughout the length of the stem 14 and threaded at each end for the reception and retention of a contact probe 16 and driving member 17 at the outer and inner ends respectively of the stem. The contact probe 16 in the illustration comprises an outwardly extending rod-like portion having a shoulder 18 at its inner end for engagement with the operating stem 14 and a broad head portion 19 for contact with a sound emitting source, as for example the chest of a patient where the device is being used as an electronic stethoscope. It will be noted that the probe 16 is thus readily removable for sterilization and that other shapes and sizes of probes may be used interchangeably for conducting observations on various objects.

Driving member 17 comprises a short pin which is threadedly retained in the inner end portion of the stem 14, and which is adapted in a manner to be later described to bear against a piezoelectric translating member in proportionate response to the instantaneous magnitude of vibrations transmitted to the probe 16. The driving member 17 may be formed integrally with stem 14 if desired, but I prefer a threaded or otherwise adjustable engagement, as shown, whereby the driving member 17 may be readily adjusted longitudinally with respect to the stem 14. A slot 17' is accordingly provided in the upper end portion of driving member 17 whereby adjustment may be accomplished by removing probe 16 and inserting a screw driver or similar instrument into the tubular stem 14.

To support the operating stem 14 for resilient reciprocable movement in the bore 13 I have provided a spider-like spring member 20 which is firmly attached to the stem 14 near the mid-section thereof and which has, in the illustrated embodiment, four circumferentially spaced radially extending legs 21 reaching substantially to the outer wall of the front housing member 10. As shown clearly in Figure 1 the front housing member 10 is provided with a short annular land portion 22, and in the preferred embodiment of the invention the radially extending legs 21 of spring 20 underlie the land portion 22 in the assembled apparatus. An annular ring 24 of plastic or other suitable material is positioned in underlying relation to the end portions of legs 21 and is adapted through the use of suitable bolts, not shown, or by mere frictional retention to retain the legs 21 in engagement with the land portions 22.

A cross section of spring 20 is shown in Figure 1, and it will be observed that each of the legs 21 has a horizontal reach of substantial length. This is often desirable where high sensitivity is desired. The horizontal reaches of legs 21 merge into upwardly and inwardly extending portions which engage and are secured to, by friction or other means, not shown, the operating stem 14. It will be noted that small downwardly extending loops 23 are formed at the merger of the horizontal and upwardly extending portions of legs 21 and these loops may be utilized advantageously as a "back-up" device to limit the extent of downward movement of the stem 14 as will appear.

According to the teachings of the invention the spring 20 is so arranged as to tend to move the stem 14 outwardly under a slight pressure. In the specific embodiment shown a shoulder formed by the thickened portion of the front housing 10, and the upper portion of the spring 20 cooperates to limit the upward movement of the stem 14. Thus, when the device is not in use the stem will be held by resilient biasing pressure in its uppermost position.

Positioned in the front housing member 10 and directly underlying the ring 24 is a substantially rigid disc 25 having an aperture located centrally therein for the reception of the driving member 17. The disc 25 may be secured in the position shown by any suitable means such as bolts, not shown.

Mounted against the underside of the disc 25, substantially to one side of the center thereof is a casing 26 which comprises a pair of relatively movable clamping parts adapted to retain a bar-shaped piezoelectric crystal 27 in the manner shown. A plurality of bolts 28 may be used to secure the casing 26 to the disc 25 and to properly clamp the crystal 27 in operative position.

Crystal 27 is clamped at its radially outermost end portion in cantilever fashion and extends inwardly in the manner shown in Figure 1 so as to underlie the driving member 17. A protective cap 29 may be placed over the end of the crystal 27 if desired to evenly distribute the loads exerted thereon by the driving member 17. The usual electrical connections, not shown, may be made with the crystal 27 whereby mechanical deformations thereof may be transmitted as electrical energy to a remote amplifying and reproducing device, also not shown.

It will be observed that the orientation of the assembled parts of my apparatus is such that with the operating stem 14 biased to its uppermost position by spring 20 the driving member 17 is out of contact with the crystal 27. Thus it may be readily understood that my device is wholly unresponsive to sounds in the form of mere air pressure variations or vibrations. To detect sound vibrations with my device it is necessary to place the probe 16 in direct contact with a vibrating object and to exert a slight pressure thereon whereby the stem 14 and driving member are forced inwardly into contact with the crystal 27. It will further be readily apparent that feedback of amplified and reproduced sounds is entirely eliminated since the probe will not move in response to mere air pressure vibrations.

To protect the crystal 27 from damage in the event my device is dropped or otherwise carelessly handled I have provided means for limiting the downward movement of the operating stem: the said means comprising disc 25 and downwardly extending loops 23 of spring 20 whereby if the probe 16 is delivered a sharp blow it will not move so far as to break or severely damage the crystal 27. The backing means is of course so oriented that the parts 25 and 23 do not interfere during normal operation of the device.

Figure 2:
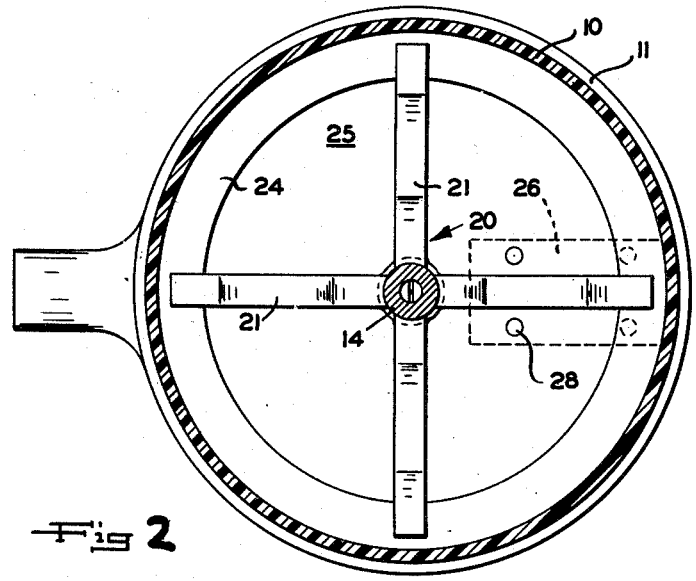
Figure 2 is a transverse cross section view of my apparatus taken substantially along line II—II of Figure 1.
Figure 3:
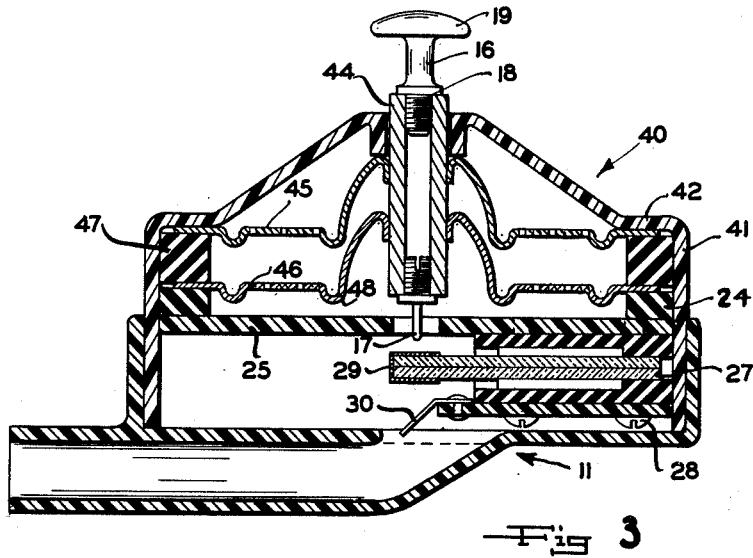
Figures 3 and 4 are longitudinal and transverse cross section views respectively of a second embodiment of my invention.
Figure 4:
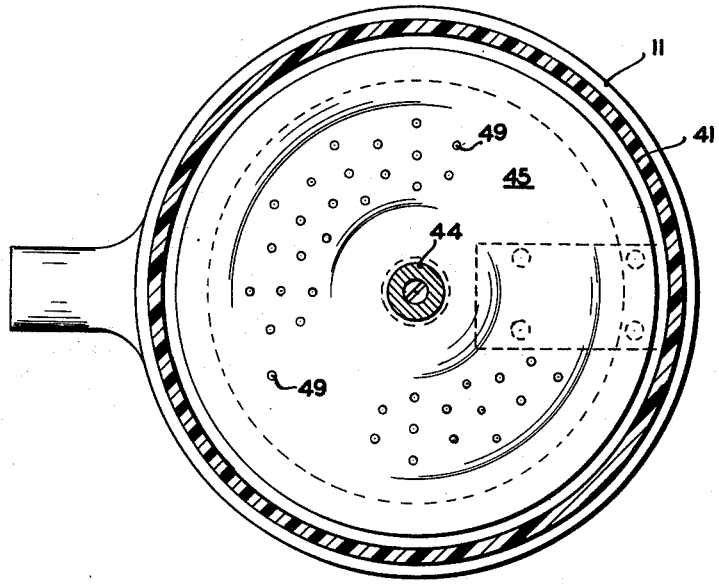

In Figures 3 and 4 I have illustrated a preferred modification of the apparatus of Figures 1 and 2 wherein are incorporated improved and simplified means for supporting and guiding the moving parts of the device. Many of the component parts of the preferred modification are identical with corresponding parts of the embodiment of Figures 1 and 2, and accordingly corresponding reference numerals will be used where possible to identify corresponding parts.

In the modified apparatus reference numerals 40 and 11 designate front and back housing members respectively, and it will be observed from comparison of Figures 1 and 3 that the front housing 40 of the modified apparatus is similar in shape to the housing 10 but is provided with an elongated side wall portion 41. The elongated side wall portion 41 provides an additional space between disc 25 and a short annular land portion 22 as is apparent from Figure 3.

An operating stem 44 is slidably received in the housing member 40 in accordance with the general teachings of the invention, but in the modification I have provided a pair of axially spaced return springs 45 and 46 which are secured to the stem 44 and housing member 40 to urge the former outwardly with respect to the latter. The upper spring 45 is retained against land 42 by means of an annular spacing ring 47, and the lower spring 46 is retained against the lower side of spacing ring 47 by means of annular ring 24. Ring 24 directly overlies the disc 25 as in the embodiment of Figures 1 and 2.

Preferably springs 45 and 46 are identical, but at least the lower spring 46 is provided with means such as loop 48 to cooperate with the upper surface of disc 25 in providing a back-up of limit stop for downward longitudinal movement of the operating stem 44.

In providing the pair of spaced spring members 45 and 46 I have advanced a construction wherein substantially all lateral movement of the operating stem is prevented. This is a particularly desirable feature since any slippage of the driving member 17 over the surface of crystal 27, or end cap 29, tends to apply undesirable vibratory signals to the crystal 27. This is true particularly where the detecting device is held in the hand of an operator, as for example where the device is used for stethoscopic purposes in medical offices.

To expedite commercial-scale manufacture of my apparatus springs 45 and 46 may be disc-like as illustrated in Figure 3, rather than spider-like as illustrated in Figure 1. This arrangement is often preferred since the forming dies and allied equipment required to produce a disc-like spring member are more readily machined than is equivalent apparatus for producing a spider-like spring member.

Where disc-like spring members are utilized I avoid acoustic pick-up and feed back by providing a multiplicity of perforations 49 in each of the discs 45 and 46 whereby air pressure variations act neutrally upon the discs.

It should now be apparent that I have accomplished the objects initially set forth. My invention provides a simple and readily mass produced detecting device which may be used for observing direct mechanical movements or vibrations, and no others, as is often desirable. The inherent ruggedness, compactness and sensitivity of my device renders the same readily applicable for use as an electronic stethoscope, for example, where an accurate reproduction of a heart beat is desired.

By a novel arrangement of positioning the contact probe and associated crystal driving member normally out of contact with the crystal I provide that while the device may be constructed to detect extremely weak signals, undesirable office noises and/or conversations produce no response whatsoever in the detecting device when the same is not in actual use.

When the device is in operation all signals transmitted thereto must pass through the contact probe 16 which, being in pressure contact with an object under observation, is not subject to response to sounds transmitted through the air.

My device is ideally suited for general usage and does not require gentle handling by virtue of the protective arrangements utilized to prevent excessive movement of the contact probe when, for example, the device is dropped or otherwise carelessly handled.

Having thus described in detail a preferred embodiment of my invention what I claim as new and desire to secure by Letters Patent is:

1. A contact type vibration detecting device comprising in combination a housing having an opening therein, an operating stem slidably received in said opening for longitudinal reciprocable movement therein, a contact probe mounted at one end of said stem and positioned externally of said casing, a driving member mounted at the other end of said stem and positioned internally of said housing, spring means mounted in said housing and connecting said stem whereby to urge said stem outwardly of said housing, means comprising said spring and said housing for limiting the outward movement of said stem, a piezoelectric element mounted in said housing and underlying said driving member, said driving member and said piezoelectric element being oriented in spaced relation with said stem in its outermost limited position, the arrangement being such that upon placing said probe in pressure contact with an object to be observed said driving member will move into contact with said piezoelectric element against the restraining action of said spring.

2. A contact type vibration detecting device comprising in combination a housing member, a contact probe slidably retained by said housing, a driving member associated with said contact probe and adapted to have movement proportionately to movement of said contact probe, spring means connecting said housing and associated with said probe whereby to urge said probe outwardly of said housing, a piezoelectric element mounted in said housing and underlying said driving member in spaced relation thereto, the arrangement being such that upon placing said probe in pressure contact with an object to be observed said driving member will move into contact with said piezoelectric element against the restraining action of said spring.

3. Apparatus according to claim 2 further including means to limit the movement of said driving member.

4. A contact type vibration detecting device comprising in combination a housing, a contact probe slidably retained by said housing, a driving member associated with said contact probe and adapted to move in proportionate response to movement of said probe relative to said housing, a piezoelectric element mounted in said casing and underlying said driving member, yieldable means to maintain said driving member normally in spaced relation to said piezoelectric element, the arrangement being such that upon placing said probe in pressure contact with an object to be observed said driving member will move into contact with said piezoelectric element and upon taking said probe out of said pressure contact said driving member will move into spaced relation to said element.

5. Apparatus according to claim 4 further characterized by an elongated member connecting said probe and said driving member and mounted in said housing for longitudinal sliding movement, and said yieldable means comprising a pair of spring members secured to said elongated members at longitudinally spaced points thereon and secured to said housing, said spring members being operative to guide said elongated member in longitudinal movement.

6. Apparatus according to claim 4 further characterized by said yieldable means comprising a spring member secured to said housing and said probe, and a rigid member underlying said spring member in spaced relation thereto, the arrangement being such that said spring member and said rigid member serve to limit the movement of said probe.

7. Apparatus according to claim 4 further characterized by said housing being generally circular, said probe being retained concentrically within said housing, and said yieldable means comprising a disc-like spring member secured to said housing and said probe whereby to urge said probe outwardly of said housing, said disc-like spring member having a plurality of perforations therein.

8. Apparatus according to claim 4 further characterized by said yieldable means comprising a spring member secured to said housing and said probe whereby to urge said probe outwardly of said housing, said spring and said housing being so oriented and arranged that air pressure variations act neutrally on said spring.

References Cited in the file of this patent
UNITED STATES PATENTS

| Number | Name | Date |
|---|---|---|
| 1,966,446 | Hayes | July 17, 1934 |
| 2,121,779 | Ballantine | June 28, 1938 |
| 2,175,021 | Gibbs | Oct. 3, 1939 |
| 2,193,945 | Strauss | Mar. 19, 1940 |
| 2,289,183 | Ehret et al. | July 7, 1942 |
| 2,344,037 | Fuller | Mar. 14, 1944 |
| 2,365,738 | Williams | Dec. 26, 1944 |
| 2,383,832 | Williams | Aug. 28, 1945 |
| 2,399,513 | Shapiro | Apr. 30, 1946 |